D. W. LORDEN.
SATCHEL HANDLE.
APPLICATION FILED MAR. 12, 1918.
1,286,366.
Patented Dec. 3, 1918.
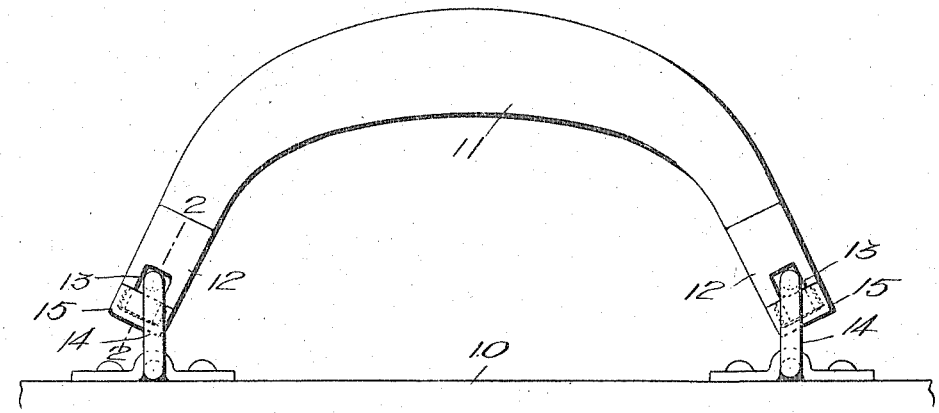
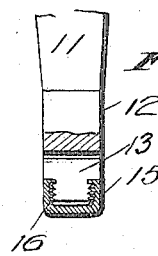
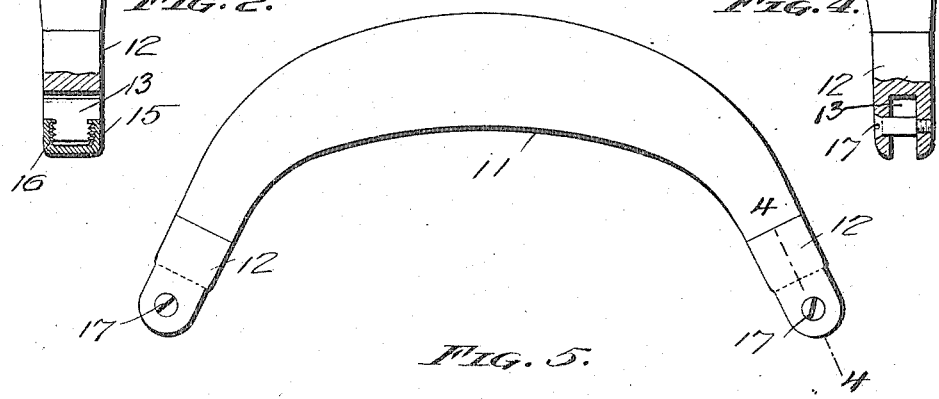
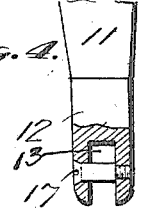
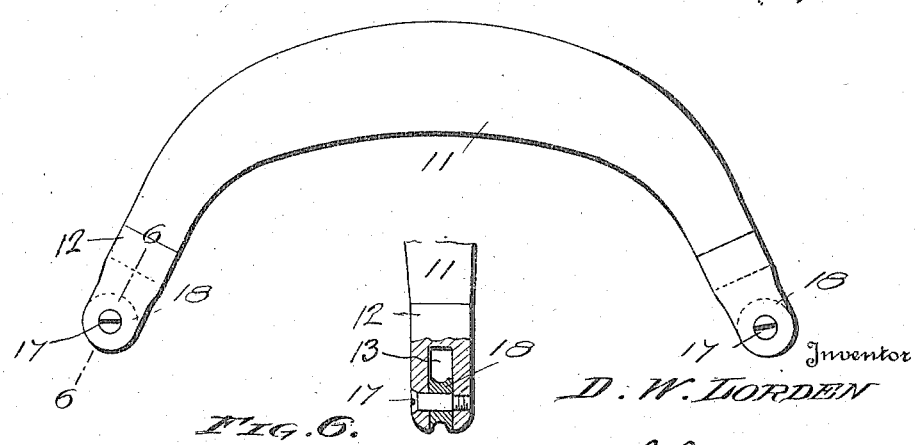
Inventor
D. W. LORDEN
Attorneys

UNITED STATES PATENT OFFICE.

DANIEL W. LORDEN, OF CHICAGO, ILLINOIS.

SATCHEL-HANDLE.

1,286,366. Specification of Letters Patent. Patented Dec. 3, 1918.

Application filed March 12, 1918. Serial No. 221,937.

*To all whom it may concern:*

Be it known that I, DANIEL W. LORDEN, a citizen of the United States, residing at Chicago, in the county of Cook and State of Illinois, have invented new and useful Improvements in Satchel-Handles, of which the following is a specification.

This invention relates to handles for traveling bags, grips, satchels and the like, and its object is to provide a novel and improved attaching means for the handle which enables the handle to be readily removed when it is worn out, for replacement by a new one.

The object stated is attained by means of a combination and arrangement of parts to be hereinafter described and claimed and in order that the same may be better understood, reference is had to the accompanying drawing forming a part of this specification.

In the drawing,

Figure 1 is an elevation of the handle;

Fig. 2 is a section on the line 2—2 of Fig. 1;

Fig. 3 is an elevation showing another embodiment of the invention;

Fig. 4 is a section on the line 4—4 of Fig. 3;

Fig. 5 is an elevation showing still another embodiment of the invention, and

Fig. 6 is a section on the line 6—6 of Fig. 5.

Referring specifically to the drawing 10 denotes a fragment of a hand grip or the like, provided with a handle 11. The ends of this handle are fitted with end pieces 12 having their outer ends recessed as shown at 13 so that they may be slipped over rings 14 which are permanently attached to the grip, and upon applying retaining members to the end pieces for the rings, the handle is securely attached to the grip.

Various forms of retaining members may be provided. The one shown in Figs. 1 and 2 comprises a cap 15 which is internally threaded to screw on the reduced threaded end 16 of the part 12, and when said cap is in place it closes up the outer end of the recess 13 and this prevents the part 12 from slipping off the ring 14.

To remove the handle 11 from the rings 14, it is necessary only to remove the caps 15 from the end pieces 12, which leaves the outer ends of the recesses 13 open and allows said end pieces to be slipped off the rings. The handle can therefore be easily removed when it is worn out, and a new one put in its place.

Figs. 3 and 4 show a retaining member consisting of a removable screw 17 threaded through the recessed end of the part 12 to extend across the recess 13. Where this screw crosses the recess, it may be fitted with a grooved anti-friction wheel 18 as shown in Figs. 5 and 6 to reduce wear on the screw when the handle is applied to a heavy grip, satchel or the like.

I claim:

The combination with a hand grip, satchel or the like; of a handle therefor having end pieces provided with recesses opening through the extremities thereof, rings attached to the hand grip on the outside thereof and seating in the recesses, and retaining members for the rings extending across and closing the outer ends of the recesses, said members being detachably secured to the end pieces.

In testimony whereof I affix my signature.

DANIEL W. LORDEN.

Copies of this patent may be obtained for five cents each, by addressing the "Commissioner of Patents, Washington, D. C."